United States Patent [19]
Cataland

[11] 3,714,399
[45] Jan. 30, 1973

[54] RACE CALCULATOR

[76] Inventor: James A. Cataland, 558 Edward Lane, Campbell, Ohio 44405

[22] Filed: Jan. 21, 1972

[21] Appl. No.: 219,745

[52] U.S. Cl.................235/114, 116/133, 235/61 G
[51] Int. Cl..............................................G04b 17/06
[58] Field of Search ..235/74, 88, 113, 114; 116/133; 35/74; 40/70; 235/85 R, 61 G, 70 R, 70 A, 78

[56] References Cited

UNITED STATES PATENTS

| | | | |
|---|---|---|---|
| 1,686,843 | 10/1928 | Burke | 235/85 R |
| 2,185,202 | 1/1940 | Kuhlman | 235/70 R |
| 2,283,799 | 5/1942 | Favalora | 235/88 R |
| 2,325,761 | 8/1943 | Fleischer | 235/88 |
| 2,392,877 | 1/1946 | Pym | 235/70 R |
| 2,794,597 | 6/1957 | Maloof | 235/61 G |
| 3,045,906 | 7/1962 | Burg | 235/70 R |
| 3,053,447 | 9/1962 | Azar | 235/70 A |
| 3,232,531 | 2/1966 | Hodge, Jr. | 235/70 R |
| 3,473,731 | 10/1969 | Kurland | 235/70 R |
| 3,635,397 | 1/1972 | Kurland | 235/78 |

Primary Examiner—Richard B. Wilkinson
Assistant Examiner—Stanley A. Wal
Attorney—Webster B. Harpman

[57] ABSTRACT

A race calculator for selecting a race horse in a horse race, the calculator consisting of a series of predictor dials each of which can be set to represent points as determined from the horses performance in previous races and with respect to pace, consistency, class, speed and weight; each dial giving a numerical figure result; addition of the points on the several dials produces a point rating. Comparison of the point ratings thus obtained indicates the likely contenders in a race.

4 Claims, 3 Drawing Figures

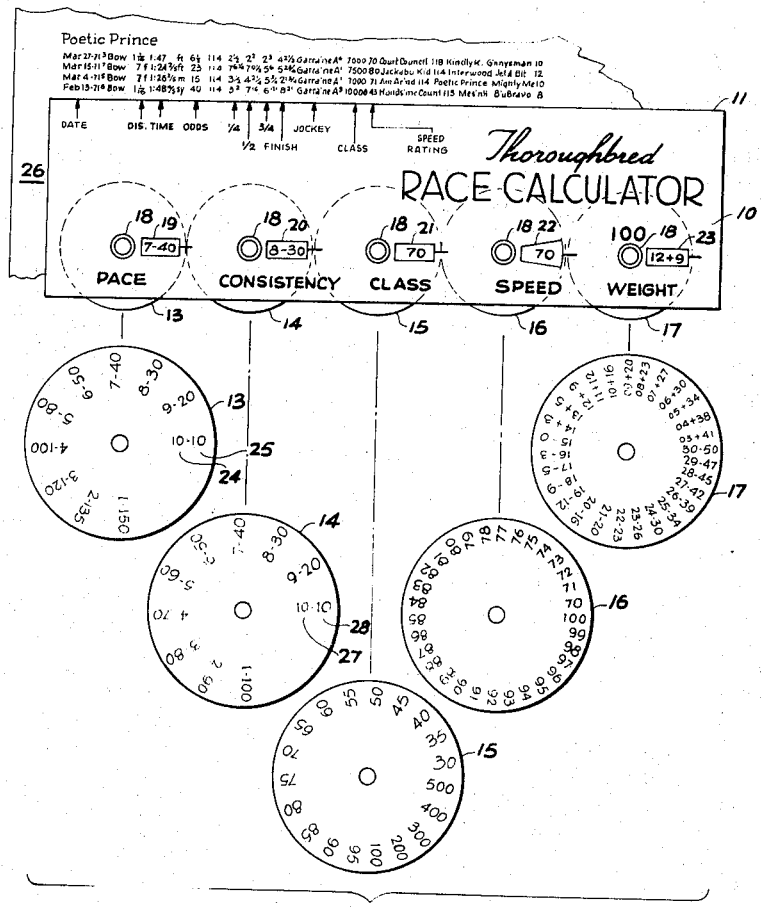

PATENTED JAN 30 1973 3,714,399

FIG. 1

Poetic Prince
Mar 27-71 ³Bow 1¹⁄₁₆ 1:47 ft 6¼ 114 2½ 2² 2³ 4²½ Garra'ne A⁶ 7000 70 Court Council 118 Kindly K. G'nnysman 10
Mar 15-71 ⁷Bow 7f 1:24⅖ ft 23 114 7⁶¼ 7⁹½ 5⁶ 5²¾ Garra'ne A¹ 7500 80 Jackabu Kid 114 Interwood Jet A Bit 12
Mar 4-71 ⁵Bow 7f 1:26⅖ sm 15 114 3½ 4²¼ 5¾ 2¹¾ Garra'ne A¹ 7000 71 Am Ar'nd 114 Poetic Prince Mighty Me 10
Feb 13-71 ⁶Bow 1¹⁄₁₆ 1:48⅗ sy 40 114 3² 7¹⁶ 6⁴¹ 8²¹ Garra'ne A⁵ 10000 43 Hands'me Count 115 Mes'nll. B'uBravo 8

DATE   DIS. TIME  ODDS  ¼  ¾  JOCKEY  CLASS  SPEED RATING
              ½  FINISH

*Thoroughbred*
RACE CALCULATOR

PACE  CONSISTENCY  CLASS  SPEED  WEIGHT

RACE CALCULATOR

BACKGROUND OF THE INVENTION

1. Field of the Invention

This invention relates to race calculators useful in establishing point values for race horses based on their prior performance, consistency and other factors which point values can be compared to indicate likely contenders in a given race.

2. Description of the Prior Art

Prior calculators of the type have employed similar structural arrangements for indicating factors with respect to age, form and weight of a horse. (See for example U.S. Pat. No. 3,558,044.)

This invention makes possible the acuate determination of point values based on statistics relative to a particular horses prior performance as published for example in a racing form with which the invention is utilized.

SUMMARY OF THE INVENTION

A race calculator useful in selecting a race horse in a horse race provides manually movable dials carrying point values related to the statistical record of a race horse as given in a racing form whereupon setting of the dials and adding or subtracting the several totals thereon results in a point value for a race horse which may be compared with other similarly obtained point values in determining a likely contender in a given horse race.

DESCRIPTION OF THE DRAWINGS

FIG. 1 is a top plan view of the race calculator superimposed on a section of a printed racing form.

FIG. 2 is a top plan view of a plurality of indicia carrying dials found in the race calculator of FIG. 1.

FIG. 3 is an end view of the race calculator of FIG. 1.

DESCRIPTION OF THE PREFERRED EMBODIMENT

In its simplest form the race calculator disclosed herein takes the form of a calculator case 10 formed of a single rectangular sheet of plastic material that is centrally folded over as at 11 to form front and rear portions, the front portion of which is indicated by the numeral 10 and the rear portion by the numeral 12. The space between the portions 10 and 12 receives a plurality of circular dials 13, 14, 15, 16 and 17 respectively. The dials 13 through 17 are positioned between the front and back portions 10 and 12 of the calculator so as to protrude partly outwardly from one edge thereof and each of the dials is rotatably positioned by means of a centrally placed grommet 18 which is positioned centrally through each of the dials and through the front and rear panels of the calculator, (see FIG. 3 of the drawings).

The front portion 10 of the calculator has a plurality of windows 19, 20, 21, 22, and 23 spaced longitudinally thereof and adjacent each of the grommets 18 and arranged for registry over a portion of the dials therebeneath. As illustrated in FIG. 1 of the drawings, the window 19 registers with a portion of the dial 13, the window 20 registers with a portion of the dial 14, the window 21 registers with a portion of the dial 15, the window 22 registers with a portion of the dial 16 and the window 23 registers with a portion of the dial 17.

In FIG. 2 of the drawings large plan views of each of the dials 13, 14, 15, 16 and 17 may be seen and it will be observed that they are positioned below their respective positions in the plan view of the race calculator as seen in FIG. 1 of the drawings. It will further be seen that the dial 13, which is positioned adjacent the notation PACE on the calculator front portion 10, has two circumferential radially spaced rows of numerals 24 and 25 respectively printed thereon. The inner circumferential row of numerals 24 includes a circumferentially spaced numerals 1 through 10 while the outer circumferentially arranged row of numerals 25 includes circumferentially spaced numerals 10, 20, 30, 40, 50, 80, 100, 120, 135 and 150 respectively.

It will be observed that a numeral from each of the rows 24 and 25 are arranged in side by side relation; for example the numeral 10 in the row 24 is arranged beside the numeral 10 in the row 25 while the numeral 1 in the row 24 is arranged beside the numeral 150 in the row 25. The window 19 is thus capable of exhibiting the two numerals in the two rows and as shown in FIG. 1 of the drawings the numeral 7 in row 24 appears in the window 19 along with the numeral 40 from the row 25.

Thus the dial 13 indicates the pace of a particular horse in a particular race determined by the horse's position in the race at the one-half mile point. As shown in FIG. 1, the PACE dial 13 shows that the horse was in 7th position and has been given a point value of 40. The setting of the dial 13 is determined by lining up the indicia ½ inch and its vertical pointing arrow with the column in the racing from indicating the position of the horse at the half mile point in the race of February 13, 1971 as appears in the representation of a portion of a racing form 26 in FIG. 1 of the drawings.

By referring thereto, it will be noted that the example given carries the horse's name POETIC PRINCE and includes the pertinent data of four races indicated by their dates in the far left column of the racing form 26. The next column to the right indicates the particular race track; BOWIE, MARYLAND, the next column to the right, the distance of the race, the next column the time of the race, the next column the odds on the particular horse in the race, the next column the weight carried, the next column the horse's position at the one-quarter mile point, the next column the hors's position at the half mile point, the next column the horse's position at the three-quarter mile point, and the next column the horse's position at the finish. The next column has the jockey's name, the next column indicates the class and the final column the speed rating. This information is readily identified by the corresponding indicia and vertical arrows along the upper edge of the front portion 10 of the race calculator as seen in FIG. 1 of the drawings and it will be observed that the statistics with respect to the February 13, 1971 race has been utilized in the examples hereinafter given.

Thus, the dial 13 indicating the pace point value has been set at 7–40 indicating that the horse was in 7th place at the half mile and given a 40 point value.

By referring now to FIG. 2 of the drawings it will be seen that the dial 14 includes two circumferential rows of figures, the inner row including the FIGS. 1 through 10 and indicated by the numeral 27, while the outer row includes the numerals 10 through 100 by tens and indicated by the numeral 28.

By referring again to FIG. 1 of the drawings it will be seen that the consistency window 20 has been set in accordance with the racing form performance indicating that the horse was 8th at the finish and therefore has been given a 30 point value. The next window 21 is the CLASS varient indicator and the figure 70 shown therein is derived by taking ten percent (10 percent) of the lowest classified claiming price of the last three races the horse ran in. As shown in FIG. 1 of the drawings, the racing form 26 shows the lowest price to be $7,000.00 and accordingly the ten percent (10 percent) figure 70 is entered by rotating the dial 15.

By referring to FIG. 2 of the drawings it will be seen that the dial 15 has a circumferential row of numerals including the numerals 30 through 100 by fives along with the numerals 200, 300, 400 and 500.

By referring again to FIG. 1 of the drawings, the window 22 will be seen to be positioned adjacent the SPEED varient so that one of a row of numerals on a dial 16 registers therewith. This is determined from the speed rating in the racing form 26 and as seen in FIG. 1 of the drawings, the numeral 43 appeared in the racing form statistics thereby resulting in setting of the dial 16 to the lowest numeral thereon and as seen in FIG. 2 of the drawings this is the numeral 70.

The SPEED varient is figured by taking the horse's last speed rating in his last race. If the horse has shown an improvement over his last three races, 2 point values are added for each point of improvement.

By referring again to FIG. 1 of the drawings the window 23 will be seen to be adjacent the WEIGHT varient. The numeral 100 also appears on the race calculator adjacent the window 23 and the WEIGHT varient is determined by adding or subtracting points in relation to today's weight. For example as seen in FIG. 1 of the drawings, today's weight is indicated at 112 pounds together with the indication that 9 point value is added. If for example the today's weight was 103 pounds a 41 point value would be added. If for example today's weight was 120 pounds a 16 point value would be subtracted. All of the pertinent weights in addition to the fixed 100 are shown on the inner circumferential row of the dial 17 with the plus or minus value points in the outer circumferential row.

In making a final determination as to whether or not the horse is a good contender, the total point values indicated in the windows 19, 20, 21 and 22 are added and the plus or minus point values in the window 23 are added or subtracted as the case may be. The final figure when compared with similarly derived figures based on the statistics of the other horses in the race, determines the position of the several contenders. If the particular horse being calculated has not run within the last 30 days it has been determined that the final figure is more accurate if 50 points are subtracted from the total, and if the horse has not run within the last 60 days, 100 points may be subtracted for a more accurate predication.

It will thus be seen that by utilizing the race calculator disclosed herein and determining the point values of the several horses in a race to be run, the respective point values will rather definitely indicate the probable position of the several contenders in the race.

An instruction text comprising the explanation hereinbefore appearing with respect to the manner of setting the dials 13 through 17 is imprinted on the back portion 12 of the race calculator and it will therefore be seen that the race calculator disclosed herein advantageously utilizes the critical statistics of a horse's performance in determining a point value which may be compared with similarly determined point values of other horses.

Having thus described my invention what I claim is:

1. A race calculator comprising superimposed front and rear panels in combination with a series of predictor dials rotatably mounted between said panels and protruding laterally therefrom, windows formed in said front panel for registry with portions of said predictor dials, predetermined numerical sets of indicia relating to pace, consistency, class, speed and weight factors of race horses imprinted on said predictor dials in circumferential and radially spaced rows whereby rotation of said indicator dials causes each set of indicia to come into view through one of said windows, in combination with indicating arrows and indicia imprinted on said race calculator and relating to past performances data in columns of printed racing form publications said arrows and indicia indicating certain of said past performances data of said racing form to be dialed on said predictor dials to cause specific numerical sets of indicia to appear through said dial windows some of which when totaled provides a comparative evaluation of a particular race horse.

2. The race calculator set forth in claim 1 and wherein the arrows and indicia imprinted on the race calculator are arranged in a horizontal pattern conforming with the left to right read-out of a past performances data column in a printed racing form publication.

3. The race calculator set forth in claim 1 and wherein the pace predictor dial thereof includes two circumferential rows of radially and circumferentially spaced numerals, one of the rows including numerals representing the horse's position at the one-half mile in a given race and the other row indicating value points for such position.

4. The race calculator set forth in claim 1 and wherein the consistency predictor dial thereof includes two circumferential rows of radially and circumferentially spaced numerals, one of the rows including numerals representing the horse's position at the finish of a race and the other row indicating value points for such position.

* * * * *